(12) United States Patent
Masuyama et al.

(10) Patent No.: US 6,186,556 B1
(45) Date of Patent: *Feb. 13, 2001

(54) ENCLOSED TYPE COMPRESSOR AND ITS MANUFACTURING METHOD

(75) Inventors: Ryoko Masuyama, Gamo-gun; Akiko Mori; Shigeru Muramatsu, both of Kusatsu; Hiroyuki Masunaga, Yamanashi, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/000,849

(22) Filed: Dec. 30, 1997

(30) Foreign Application Priority Data

Jan. 7, 1997 (JP) ................................................ 9-000513

(51) Int. Cl.[7] ....................................................... F16L 35/00
(52) U.S. Cl. ............................ 285/24; 285/27; 285/55; 285/330; 285/332; 285/332.1
(58) Field of Search .................... 285/329, 55, 332, 285/332.1, 288.1, 24, 27

(56) References Cited

U.S. PATENT DOCUMENTS

| | | | |
|---|---|---|---|
| 746,801 | * | 12/1903 | Earheart ................................. 285/24 |
| 1,402,978 | * | 1/1922 | Thomas .................................. 285/24 |
| 1,513,687 | * | 10/1924 | Bacon .................................... 285/27 |
| 2,516,743 | * | 7/1950 | Allin . |
| 4,508,367 | * | 4/1985 | Oreopoulos ............................ 285/3 |
| 4,659,116 | * | 4/1987 | Cameron ................................ 285/27 |
| 5,171,042 | * | 12/1992 | Faidiga .................................. 285/55 |
| 5,215,452 | * | 6/1993 | Yamamura et al. ................. 418/55.6 |
| 5,217,359 | * | 6/1993 | Kawahara et al. .................. 418/55.4 |
| 5,338,072 | * | 8/1994 | Bitter et al. .......................... 285/286 |
| 5,667,255 | * | 9/1997 | Kato .................................. 285/332 X |
| 5,695,326 | * | 12/1997 | Oka et al. .......................... 418/55.1 |
| 5,848,813 | * | 12/1998 | Albrecht .............................. 285/332 |

* cited by examiner

*Primary Examiner*—Lynne H. Browne
*Assistant Examiner*—Alison K. Pickard
(74) *Attorney, Agent, or Firm*—McDermott, Will & Emery

(57) ABSTRACT

A compression element located inside an enclosed compressor is disclosed for receiving a connection pipe from outside the compressor. The compressor has an opening one in one of its walls. The compression element has a bore running through it. An inlet end of the compression element is joined to the wall of the compressor at the opening. The inlet end of said bore is tapered in the form of a curved shape that spreads smoothly toward the opening. A guide pipe has one of its ends installed into the opening from outside the compressor. A connection pipe having a cooper plated exterior surface is inserted through the guide pipe, press-fitted into the inlet end of the compression element and joined to the compression element. The connection pipe has another end connected to a suction pipe for circulating a refrigerant within the compressor via the compression element.

40 Claims, 2 Drawing Sheets

ENCLOSED TYPE COMPRESSOR AND ITS MANUFACTURING METHOD

BACKGROUND OF THE INVENTION

The present invention relates to an enclosed type compressor used in a refrigerating machine, air conditioner and others, and more particularly, to the connection between the connection pipe and the compression element used in the enclosed type compressor. A sectional view of a conventional enclosed type compressor is shown in FIG. 3. In FIG. 3. when connecting a suction pipe 101 to an enclosed type compressor, first, a motor 103 and a compression element 104, such as a cylinder 105, are accommodated and fixed in an enclosed container 102 by press-fitting or other means. Then a connection pipe 107 is inserted from outside of a case into a refrigerant suction hole 106 formed in the cylinder 105. Further, the suction pipe 101 is coupled to this connection pipe 107.

An essential sectional view showing the connection state of a conventional suction pipe is shown in FIG. 4. In a connection pipe insertion hole 110 in the enclosed container 102, a guide pipe 109 is preliminarily affixed by silver brazing or other means. In this enclosed container 102, the motor 103 and the compression element 104, such as cylinder 105 are accommodated and fixed by press-fitting or other means. The cylinder 105 is formed in this refrigerant suction hole 106, and the connection pipe 107 is inserted into the connection pipe insertion hole 110 communicating with this refrigerant suction hole 106 by penetrating through the guide pipe 109. A copper plating 111 is applied on the outer surface of the connection pipe 107, and this copper plating facilitates brazing between the connection pipe 107 and the suction pipe 101 of the accumulator.

In the conventional structure in FIG. 4, however, when press-fitting the copper plated connection pipe 107 into the connection pipe insertion hole 106 of the cylinder 105, the copper plating is peeled off by an inlet end portion 112 of the insertion hole. The peeled copper plating may be caught in the compression mechanism, which may lead to a locking phenomenon. To solve this problem, attempts have been made to prevent the troubles due to the peeling of copper plating by removing the copper plating preliminarily from the insertion area 120 of the connection pipe 107. However, such involves an additional cost required for removal of the copper plate. Hence, the cost of manufacturing is raised.

It is hence an object of the invention to present an enclosed type compressor capable of preventing the occurrence of the locking of the compression mechanism by preventing the peeling of the copper plating when inserting and connecting the connection pipe into the compression element.

SUMMARY OF THE INVENTION

The invention provides an enclosed type compressor comprising an enclosed container, a compression element placed in the enclosed container, and a connection pipe for connecting a suction pipe for circulating a refrigerant to the compression element. The compression element has an insertion hole for inserting a first end of the connection pipe inside. The insertion hole has an inlet in a shape smoothly spreading toward the inlet. The connection pipe has a plating layer formed at least on the outer surface. The first end of the connection pipe is press-fitted into the inlet of the insertion hole, and an outer surface of the connection pipe is connected to the inside of the insertion hole.

A method of manufacturing an enclosed type compressor of an enclosed type compressor comprising an enclosed container, a compression element placed in the enclosed container, and a connection pipe for connecting a suction pipe for circulating a refrigerant to the compression element, comprises: (a) a step of forming an inlet having a shape that spreads smoothly toward the inlet in an insertion hole of the compression element, (b) a step of placing a plating layer at least on an outer surface in the connection pipe, and (c) a step of press-fitting a first end of the connection pipe into the inlet of the insertion hole, and connecting the outer surface of the connection pipe and inside of the insertion hole.

Preferably, the plating layer is a copper plating layer.

Preferably, the compression element is a cylinder.

Preferably, a second end of the connection pipe is brazed and connected to the suction pipe placed outside of the enclosed container.

Preferably, the inlet of the insertion hole is in a curvature form of which the sectional area increases gradually toward the inlet.

Preferably, the inlet of the insertion hole is in a taper form of which the sectional area increases gradually toward the inlet.

Preferably, the taper form of the inlet of the insertion hole has an angle in a range from about 1 degree to about 30 degree.

Preferably, the connection pipe is a steel pipe.

Preferably, the copper plating layer has a thickness in a range from about 5 microns to about 100 microns.

Preferably, the invention further comprises a guide pipe installed outside of the enclosed container covering the inlet of the insertion hole. The connection pipe is connected to the insertion hole penetrating through the guide pipe.

In this constitution, when the connection pipe, having the plating layer, is press-fitted into the insertion hole of the compression element, the peeling of the plating layer of the connection pipe is prevented. Therefore, there in no peeled plating that can get caught in the compression mechanism, and the locking phenomenon due to the biting of peeled plating can be prevented. As a result, the present invention has the advantage of providing a compressor of high reliability. Moreover, it is not necessary to peel off the plating from the insertion area out of the plating layer placed in the connection pipe. As a result, the manufacturing cost is not increased.

The invention itself, together with further objects and attendant advantages, will best be understood by reference to the following detailed description taken in conjunction with the accompanying figures.

DETAILED DESCRIPTION OF THE INVENTION

Figure 1:
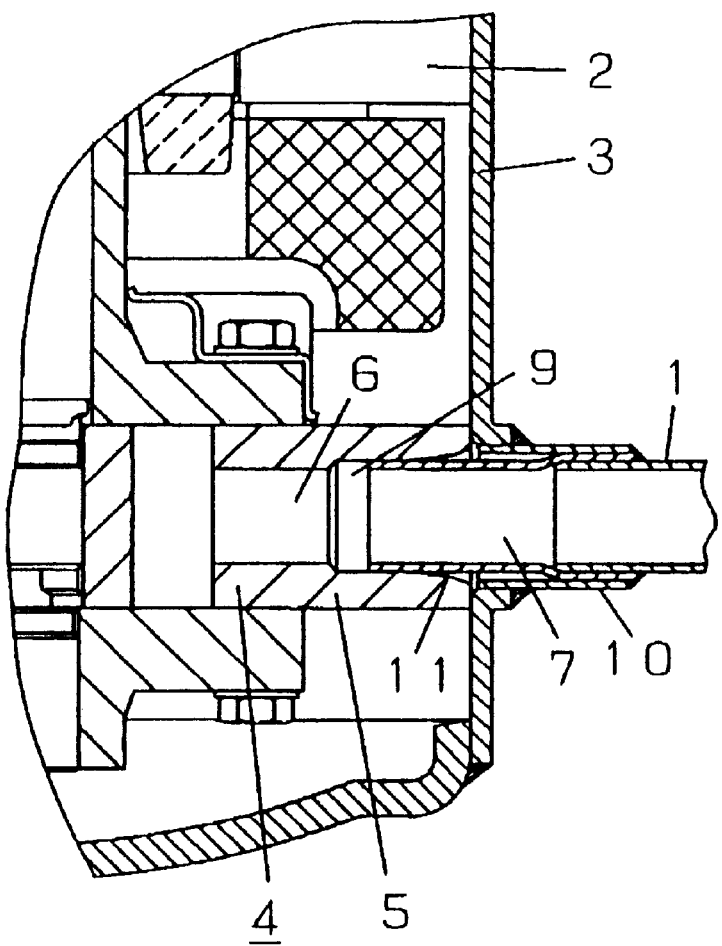
FIG. 1 is an essential sectional view of an enclosed type compressor according to an embodiment of the invention.

Referring now to the drawings, an embodiment of the invention is described below.

Figure 2:
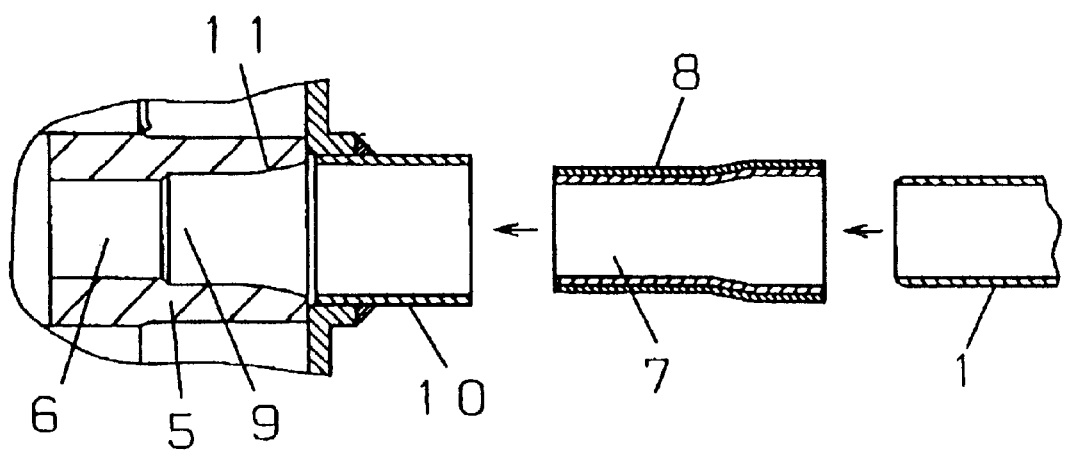
FIG. 2 is a sectional view for explaining the process of connecting a connection pipe to an insertion hole of the compressor shown in FIG. 1.
Figure 3:
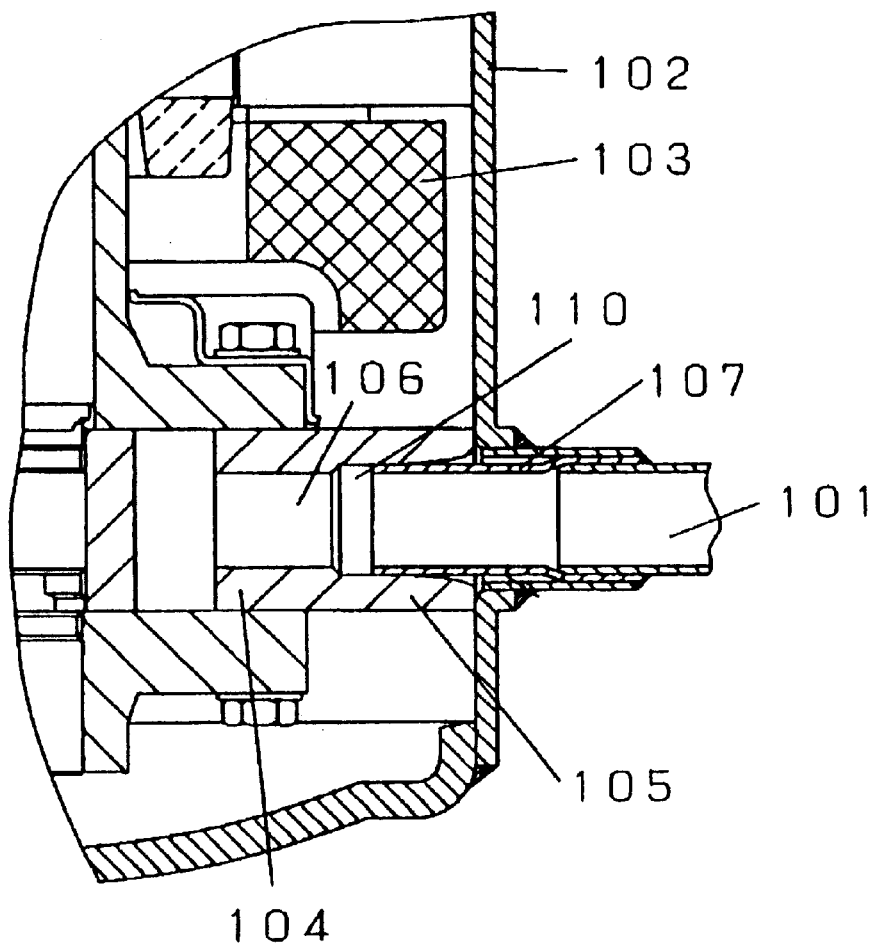
FIG. 3 is an essential sectional view of a conventional enclosed type compressor.
Figure 4:
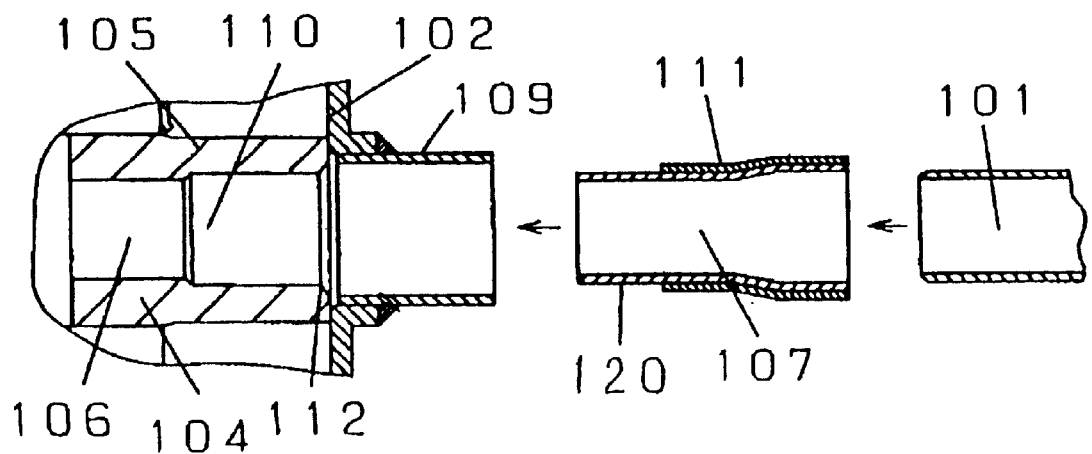
FIG. 4 is a sectional view for explaining the process of connecting a connection pipe to an insertion hole in the conventional compressor shown in FIG. 3.

FIG. 1 is a sectional view of assembling and completing a suction chamber of an enclosed type compressor according to a preferred embodiment of the invention. FIG. 2 is a sectional view for explaining the process of connecting the connection pipe to an insertion hole of the compressor shown in FIG. 1.

Referring to FIG. 1 and to FIG. 2, a method of manufacturing the compressor is described below. A motor 2 and a compression element 4, such as a cylinder 5 are accommodated and fixed in an enclosed container 3 by press-fitting or other means. The cylinder 5 includes a refrigerant suction hole 6 and an insertion hole 9 for inserting a connection pipe. The insertion hole 9 is formed at a position next to the refrigerant suction hole 6. Outside of the enclosed container 3, at a position covering the insertion hole 9, a guide pipe 10 is preliminarily fixed in the enclosed container 3 by silver brazing or other means. An inlet 11 of the insertion hole 9 has a shape that spreads smoothly toward the inlet. For example, the inlet 11 of the insertion hole 9 is shaped in the form of a taper, wherein the sectional area of the inlet 11 increases gradually toward the inlet. As a variation, the inlet 11 of the insertion hole 9 is shaped in the form of a curvature, wherein the sectional area of the inlet 11 increases gradually toward the inlet. The edge of the inlet 11 of the insertion hole 9 is shaped in a curvature form. The aperture of the spreading portion of the inlet 11 is nearly equal to the aperture of the guide pipe 11, and the spreading portion of the inlet 11 is positioned so as to correspond to the aperture of the guide pipe 10.

A first end of a connection pipe 7 penetrates through the guide pipe 10 from the outside of the enclosed container, and is press-fitted and inserted into the insertion hole 9 of the refrigerant suction hole 6 formed in the cylinder 5 by a large pressure. A plating layer 8 is placed at least on the outside surface of the connection pipe 7. As the plating layer 8, copper plating is particularly preferred. Alternatively, the plating layer 8 may be also placed on the outside and inside surfaces of the connection pipe 7. Since the inlet 11 of the insertion hole 9 has a taper form that expands smoothly, the connection pipe 7 can be inserted into the insertion hole 9 without peeling off the copper plating applied on the surface of the connection pipe 7, when the connection pipe 7 is press-fitted into the insertion hole 9 by a large force from outside of the compression mechanism. Thus, the connection pipe 7 is connected to the refrigerant suction hole 6 of the cylinder 5.

Subsequently, the suction pipe 1 is brazed to a second end of the connection pipe 7, and the suction pipe 1 and connection pipe 7 are coupled. It is also possible to insert the connection pipe 7 coupled with the suction pipe 1 into the refrigerant suction hole 6. The plating layer 8 is provided in order to facilitate the brazing of the connection pipe 7 and suction pipe 1, and to reinforce the bonding strength.

In this constitution, the refrigerant circulates in the compression element 4 through the suction pipe 1 and connection pipe 7.

In this manufacturing method, when connecting the compression element 4 such as the cylinder 5 with the connection pipe 7, the method is effective to prevent the peeling of the plating layer 8 on the outer surface of the connection pipe 7 due to contact with the edge of the inlet 11 of the insertion hole 9. Therefore, occurrence of plating pieces that have been peeled off, such as peeled copper pieces is prevented. Hence, the method prevents a locking phenomenon due to biting of a peeled plating piece that has fallen into the compression mechanism. As a result, a highly reliable compressor is obtained.

Moreover, when plating the surface of the connection pipe 7, the entire connection pipe 7 is immersed in a plating bath, and the surface of the connection pipe can be plated. In particular, the method does not require peeling process of the plating portion at the inlet of the connection pipe as required in the prior art. Hence any additional manufacturing cost is saved.

In the preferred embodiment, the shape of the insertion hole 9 may be circular, elliptical, polygonal or other cross-section, but the circular shape is particularly preferred. The shape of the connection pipe 7 should conform to the shape of the insertion hole 9. When the inlet 11 of the insertion hole 9 is tapered, its taper angle is preferred to be in a range from about 1 degree to about 30 degrees, and more preferably, in a range from about 3 degrees to about 10 degrees. In this case, a particularly excellent effect as mentioned above is obtained. If the taper angle exceeds about 30 degrees, a large gap occurs between inside of the insertion hole 9 and outside of the connection pipe 7, and the connection of the compression element 4 and connection pipe 7 may be incomplete. If the taper angle is less than about 1 degree, the effect for preventing peeling of the plating layer 8 is slightly inferior. This taper form may not be limited to a specific angle, but the angle may vary sequentially toward the inlet direction.

The material of the compression element 4 for forming the insertion hole 9 may be, for example, steel or aluminum.

The material of the connection pipe 7 is not particularly limited, but a steel pipe mainly of iron, aluminum pipe, compound plastics, and engineering plastics may be used. In particular, a steel pipe is preferred as the material for the connection pipe 7.

The plating layer 8 may be formed by copper plating, or other metal plating as far as brazing is facilitated, and the bonding strength of the connection pipe 7 and suction pipe 1 is reinforced. As the plating layer 8, particularly, copper plating is preferred. A particularly excellent effect, as mentioned above, is obtained in this constitution. The thickness of the plating layer 8 is preferred to be in a range from about 1 micron to about 500 microns, and more preferably, in a range from about 5 microns to about 100 microns. A particularly excellent effect, as mentioned above, is obtained in this constitution. If the thickness of the plating layer 8 is less than about 1 micron, the connection between the connection pipe and suction pipe may be incomplete. If the thickness of the plating layer 8 exceeds about 500 microns, the cost for of the plating work tends to increase.

The outside surface of the first end of the connection pipe 7 may also have a taper form approximately matching the shape of the inlet 11 of the insertion hole 9. In this case, the taper angle of the connection pipe 7 is preferred to be same as, or smaller than, the angle of the taper of the inlet 11. In this constitution, although the manufacturing cost of the connection pipe is increased, the effect of preventing peeling of the plating layer 8 is further enhanced.

Thus, the constitution of the invention prevents peeling of the plating layer of the connection pipe when press-fitting the connection pipe having the plating layer into the compression element. Therefore, a peeled plating piece is prevented from being caught in the compression mechanism, and hence, prevents the locking phenomenon of the compression mechanism due to biting of a peeled plating piece. As a result, a highly reliable compressor is obtained. Moreover, the peeling step of the plating in the insertion area of the plating layer applied on the connection pipe is not needed, so that the manufacturing cost is saved.

Of course, it should be understood that a wide range of changes and modifications can be made to the preferred embodiment described above and that the foregoing description be regarded as illustrative rather than limiting. It is therefore intended that it is the following claims, including all equivalents, which are intended to define the scope of this invention.

What is claimed is:

1. An enclosed type compressor comprising:

an enclosed container having an opening in a wall thereof, a compression element having a bore having an inlet end, said compression element located in said enclosed container, said bore inlet end in communication with said opening, and a connection pipe having one end for insertion into said bore inlet end in a press-fitted manner and having another end for connection to a suction pipe for circulating a refrigerant within said enclosed container via said compression element, wherein said connection pine has a plating layer formed on at least an outer surface of said connection pipe at said one end, wherein said inlet end of said bore is tapered in the form of a curved shape that spreads smoothly toward the opening so that when the connection pipe is inserted into said bore inlet end, the plating layer is not peeled off.

2. An enclosed type compressor of claim 1,
wherein said plating layer is a copper plating layer.

3. An enclosed type compressor of claim 2,
wherein said connection pipe is a steel pipe.

4. An enclosed type compressor of claim 2,
wherein said connection pipe is a steel pipe, and
wherein said copper plating layer has a thickness in a range from about 5 microns to about 100 microns.

5. An enclosed type compressor of claim 1,
wherein said compression element is a cylinder.

6. An enclosed type compressor of claim 1, wherein said another end of said connection pipe is brazed and may be connected to said suction pipe placed outside of said enclosed container.

7. An enclosed type compressor of claim 1,
wherein said inlet end of said bore is in a form of a curvature having a sectional area that increases gradually toward the inlet.

8. An enclosed type compressor of claim 1,
wherein said inlet end of said bore is in a form of a taper having a sectional area that increases gradually toward the inlet.

9. An enclosed compressor of claim 8,
wherein said taper has an angle in a range from about 1 degree to about 30 degrees.

10. An enclosed type compressor of claim 1, further comprising, a guide pipe having one end installed from outside of said enclosed container into said opening, and having another end for receiving another end of said connection pipe, wherein said connection pipe may be inserted through said guide pipe into said bore.

11. An enclosed type compressor of claim 1,
wherein an outer side of said connection pipe has a curved shape such that a taper angle of said connection pipe is equal to or less than an angle of said inlet end of said bore.

12. The enclosed type compressor of claim 1, wherein said one end of the connection pipe has a straight pipe portion having an outer surface, said bore has a straight bore portion formed at an inner side of said opening, said plating layer is formed on said outer surface of said straight pipe portion, and said outer surface of said straight pipe portion having said plating layer is fitted with said straight bore portion so that said compression element and said connection pipe are mutually connected by said press-fitted manner between said straight pipe portion and said straight bore portion.

13. The enclosed type compressor of claim 1, further comprising a guide pipe fixed by brazing so as to cover said bore.

14. The enclosed type compressor of claim 13,
wherein said another end of said connection pipe is brazed at said plating layer and connected to said guide pipe.

15. The enclosed type compressor of claim 13,
wherein an inside aperture of a spreading portion of said inlet end is nearly equal to an outside shape of said guide pipe, and said spreading portion is positioned so as to correspond to said outside shape of said guide pipe.

16. The enclosed type compressor of claim 15,
wherein said connection pipe is placed in said guide pipe, and said connection pipe may be inserted into and through said guide pipe and connected in said bore.

17. The enclosed type compressor of claim 1 wherein said inlet end comprises first and second portions connected by a transition point therebetween, such that said first portion is tapered in the form of said curved shape that spreads smoothly toward the opening and said second portion has a substantially constant diameter, wherein said connection pipe extends beyond said transition point.

18. The enclosed type compressor of claim 1 wherein said inlet end continuously spreads smoothly toward the opening.

19. The enclosed type compressor of claim 1, wherein a majority of said one end of said connection pipe is surrounded by said curved shape when said one end of said connection pipe is inserted into said bore inlet end.

20. The enclosed type compressor of claim 1, wherein said plating layer covers the entire outer surface of said connection pipe.

21. A method of manufacturing an enclosed type compressor, which comprises an enclosed container having an opening in a wall thereof, a compression element located in said enclosed container, which compression element has a bore having an inlet end in communication with said opening, and a connection pipe having one end for insertion into said bore inlet end in a press-fitted manner and having another end for connection to a suction pipe for circulating a refrigerant within said enclosed container via said compression element, said manufacturing method comprising the steps of:

(a) tapering said inlet end of said bore in the form of a curved shape that spreads smoothly toward the opening, (b) placing a plating layer at least on an outer surface of said connection pipe at said one end, and (c) press-fitting said one end of said connection pipe into said inlet end of said bore such that said plating layer is not peeled off.

22. A manufacturing method of an enclosed type compressor of claim 21, wherein said step of placing a plating layer includes the step of plating said outer surface with a copper plating layer.

23. A manufacturing method of an enclosed type compressor of claim 22, further comprising, a step of brazing and fixing another end of said connection pipe to said suction pipe.

24. A manufacturing method of an enclosed type compressor of claim 22, wherein said step of plating includes the step of copper layer plating a steel pipe.

25. A manufacturing method of an enclosed type compressor of claim 22, wherein said step of plating includes the step of copper layer plating a steel pipe, and applying a copper plating layer having a thickness in a range from about 5 microns to about 100 microns.

26. A manufacturing method of an enclosed type compressor of claim 21, wherein said compression element is a cylinder.

27. A manufacturing method of an enclosed type compressor of claim 21, wherein step of tapering said inlet end of said bore forms a curvature having a sectional area that increases gradually toward the inlet.

28. A manufacturing method of an enclosed type compressor of claim 21, wherein step of tapering said inlet end of said bore forms a taper having a sectional area that increases gradually toward the inlet.

29. A manufacturing method of an enclosed type compressor of claim 28, wherein said step of tapering said inlet of said bore forms an angle in a range from about 1 degree to about 30 degrees.

30. A manufacturing method of an enclosed type compressor of claim 21, wherein said step (c) includes the steps of:
passing said one end of said connection pipe through a guide pipe, said guide pipe having one end installed from outside of said enclosed container into said opening and having another end for receiving the other end of said connection pipe,
press-fitting said one end of said connection pipe into said inlet of said bore, and
connecting the outer surface of said one end of said connection pipe with an inner surface of said inlet end of said bore.

31. A manufacturing method of an enclosed type compressor of claim 21, further comprising, a step of tapering said first end of said connection pipe to form a curved shape such that a taper angle of said connection pipe is equal to or less than an angle of said inlet end of said bore.

32. The manufacturing method of an enclosed type compressor of claim 21, wherein said one end of the connection pipe has a straight pipe portion having an outer surface, said bore has a straight bore portion formed at an inner side of said opening, and said plating layer is formed on said outer surface of said straight pipe portion, and wherein said step of press-fitting includes the step of fitting said outer surface of said straight pipe portion having said plating layer into said straight bore portion.

33. The manufacturing method of claim 21, further comprising the step of:

(d) fixing a guide pipe by brazing so as to cover said bore.

34. The manufacturing method of claim 33, wherein an inside aperture of a spreading portion of said inlet end is nearly equal to an outside shape of said guide pipe, and said spreading portion is positioned so as to correspond to said outside shape of said guide pipe.

35. The manufacturing method of claim 33, wherein at said (d) step, said connection pipe is placed in said guide pipe, and said connection pipe is inserted into and through said guide pipe and connected in said bore.

36. The manufacturing method of claim 33, further comprising the step of:

(e) brazing said another end of said connection pipe at said plating layer for connecting to said guide pipe.

37. The method of manufacturing an enclosed type compressor of claim 21, wherein said inlet end comprises first and second portions connected by a transition point therebetween, such that said first portion is tapered in the form of said curved shape that spreads smoothly toward the opening and said second portion has a substantially constant diameter, wherein said connection pipe extends beyond said transition point.

38. The method of manufacturing an enclosed type compressor of claim 21, wherein said inlet end continuously spreads smoothly toward the opening.

39. The method of manufacturing an enclosed type compressor of claim 21, wherein a majority of said one end of said connection pipe is surrounded by said curved shape when said one end of said connection pipe is inserted into said bore inlet end.

40. The method of manufacturing an enclosed type compressor of claim 21, wherein said plating layer covers the entire outer surface of said connection pipe.

* * * * *